C. R. KINNIE.
COOKING UTENSIL.
APPLICATION FILED SEPT. 15, 1916.

1,266,816.

Patented May 21, 1918.

WITNESSES
W. C. Fielding
Lloyd W. Patch

INVENTOR
Clarence R. Kinnie

BY Richard B. Owen,
ATTORNEY

UNITED STATES PATENT OFFICE.

CLARENCE R. KINNIE, OF WOLFVILLE, NOVA SCOTIA, CANADA.

COOKING UTENSIL.

1,266,816.  Specification of Letters Patent.  Patented May 21, 1918.

Application filed September 15, 1916. Serial No. 120,390.

*To all whom it may concern:*

Be it known that I, CLARENCE R. KINNIE, a subject of the King of Great Britain, residing at Wolfville, in the Province of Nova Scotia and Dominion of Canada, have invented certain new and useful Improvements in Cooking Utensils, of which the following is a specification.

This invention relates to an improvement in cooking utensils, and more particularly to devices of this sort intended for use in the preparation of potatoes, and other vegetables and foods which possess more or less size and which require to be cooked by boiling and then to be drained.

An object of my invention is to provide a pair of wire mesh containers so constructed that vegetables or other food products may be placed therein and the containers can be placed in a pot or other suitable receptacle containing the water in which the food products are to be boiled.

A further object is to provide means by which the two wire mesh receptacles are held together as they are to be set in the water, and are yet permitted to be separated so that the food products may be placed in each.

With the above and other objects in view, my invention consists in certain novel features of construction, and combinations of parts which will be hereinafter set forth in connection with the drawings and then more particularly pointed out in the claims.

Figure 1:
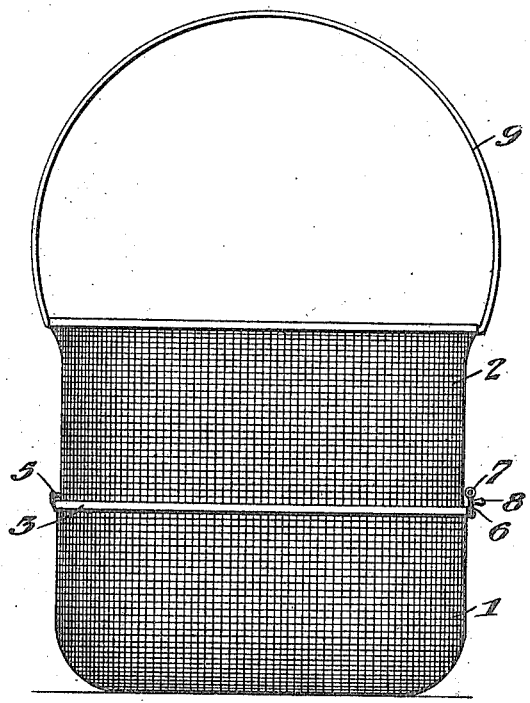
Figure 1 is a view in elevation of the utensil with the parts adjusted to the relation which they will occupy when the device is placed in use.
Figure 2:
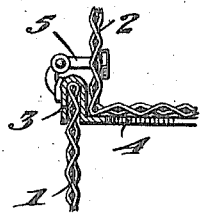
Fig. 2 is a fragmentary sectional view to show the hinged connection between the two receptacles.
Figure 3:
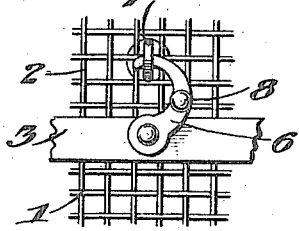
Fig. 3 is a detail elevational view to show the means by which the receptacles are held in the closed relation.

The containers 1 and 2 are preferably made of wire mesh, the size of the mesh of course depending in a great measure upon the food stuffs which are to be cooked in the receptacles, and here it might be mentioned that under some circumstances it might be found desirable to make the lower receptacle 1 of wire having a given mesh and the upper receptacle 2 of wire fabric having a larger or smaller mesh so that the two receptacles will be acceptable for the reception of food stuffs of various sizes. Each of the receptacles is preferably left open at its top and it may be found desirable to provide a rim portion 3 for the lower receptacle which will have the inwardly extending flange portion 4 to support the upper receptacle 2, it being understood that this upper receptacle is made of such a diameter that it will fit within the rim portion 3 to be removable therefrom. A hinged connection is provided at 5 to secure the upper and lower receptacles together in such relation that the upper receptacle may be swung back from the position in which it closes over the lower receptacle, and a latch or securing member 6 is provided to be received through the staple or eye 7 so that the two receptacles will be connected and secured together at a point opposite to the mounting of the hinge 5. It is perhaps preferable that a handle 8 be provided to allow more ready manipulation of the latch or fastening members 6, and also a bail or handle 9 is preferably provided on the upper receptacle 2 so that the device as an entirety may be readily lifted from and placed within the receptacle in which the water is contained.

In the use of the device, vegetables or other food stuffs are placed in the lower receptacle 1 and then the upper receptacle 2 is brought down to rest against the flange 4 after which the latch member 6 is swung to engage through the eye 7 and after the proper food stuffs have been placed in the upper receptacle 2, the utensil is lowered into a pot or receptacle containing the water in which the food stuffs are to be boiled, after which the bail or handle may be swung down and the pot or receptacle may be covered if this is desired. When the food stuffs have been cooked for the proper length of time, the handle 9 may be raised and then the utensil may be lifted from the water after which the contents of one or both of the receptacles may be removed. In some cases it may be found that one of the food stuffs will require longer cooking than the other, and it will be seen that under these circumstances the food stuff may be removed from the remaining receptacle and the utensil may be again placed back in the water or a new supply of food stuff may be even placed in the receptacle which has been emptied, the hinged mounting of the two receptacles together giving ready access to the lower receptacle even when the upper receptacle has food stuffs therein.

From the foregoing it will be seen that I have provided a cooking utensil which is so arranged that the fuel used in cooking can be saved over the old method of cooking which requires that a separate cooking utensil be provided for each food product, and also it will be apparent that by the use of the device food stuffs of varied flavors might be placed in the two receptacles and thus the flavor would be carried from the one to the other by the boiling water while at the same time the respective foods would be kept separate and could be served separate following the cooking. While in the foregoing I have made mention of two separate receptacles, it will be understood that a greater number of receptacles might be provided and for that matter might be connected together in the same manner, and also it will be understood that a number of other changes and variations might be resorted to in the form and arrangement of the several parts without departing from the spirit and scope of my invention, in view of which I do not wish to be limited to the exact disclosure, but rather to such points as may be set forth in the claims.

I claim:

1. A cooking utensil comprising a lower receptacle having wire mesh sides and bottom and provided with a rim around the upper edge thereof having an inwardly disposed supporting flange, a second receptacle of wire mesh made of a size to fit within the rim and to be held and supported by the flange, a hinge by which the second receptacle is hinged at one side to the upper edge of the first mentioned receptacle in a position to be swung down upon and supported by the supporting flange, releasable fastening means carried by said receptacles at a point opposite to the mounting of the hinge to secure the second mentioned receptacle fixedly in the mouth of the first mentioned receptacle and upon the supporting flange, and a handle connected with the second mentioned receptacle by the use of which both receptacles may be lifted and carried.

2. A cooking utensil comprising a pair of receptacles of wire mesh one of which is made sufficiently small at the bottom to be received within the open top of the other, the last mentioned receptacle having a flange for the support of the receptacle received therein, a hinged connection between said receptacles at one side thereof so that the upper receptacle may be swung back to give access to the lower receptacle, and means to secure the upper receptacle down against the flange of the lower receptacle.

In testimony whereof I affix my signature in presence of two witnesses.

CLARENCE R. KINNIE.

Witnesses:
 Wm. C. Bleakney,
 Carleton M. Kinnie.

Copies of this patent may be obtained for five cents each, by addressing the "Commissioner of Patents, Washington, D. C."